US008830294B2

(12) United States Patent
Wu

(10) Patent No.: US 8,830,294 B2
(45) Date of Patent: Sep. 9, 2014

(54) METHOD AND SYSTEM FOR VIDEO CONFERENCE CONTROL, VIDEOCONFERENCING NETWORK EQUIPMENT, AND VIDEOCONFERENCING SITE

(75) Inventor: Jiaoli Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 278 days.

(21) Appl. No.: 13/305,312

(22) Filed: Nov. 28, 2011

(65) Prior Publication Data

US 2012/0069133 A1   Mar. 22, 2012

Related U.S. Application Data

(63) Continuation of application No. PCT/CN2010/073178, filed on May 25, 2010.

(30) Foreign Application Priority Data

May 27, 2009 (CN) .......................... 2009 1 0085742

(51) Int. Cl.
*H04N 7/14* (2006.01)
*H04N 7/15* (2006.01)
*H04L 12/18* (2006.01)

(52) U.S. Cl.
CPC .................. *H04N 7/15* (2013.01); *H04N 7/152* (2013.01); *H04L 12/1818* (2013.01)
USPC ...................................................... 348/14.08

(58) Field of Classification Search
USPC .................... 379/202.01; 348/14.08
See application file for complete search history.

(56) References Cited

U.S. PATENT DOCUMENTS

| 2005/0084086 | A1* | 4/2005 | Hesse ...................... 379/202.01 |
| 2006/0092269 | A1  | 5/2006 | Baird et al. |
| 2008/0267282 | A1  | 10/2008 | Kalipatnapu et al. |

FOREIGN PATENT DOCUMENTS

| CN | 1622620 A | 6/2005 |
| CN | 1697517 A | 11/2005 |
| CN | 101083752 A | 12/2007 |
| CN | 101141614 A | 3/2008 |
| CN | 101252671 A | 8/2008 |
| CN | 101257606 A | 9/2008 |
| JP | 10164541 A | 6/1998 |
| WO | WO 2007/123965 A2 | 11/2007 |
| WO | WO 2010/034254 A1 | 4/2010 |

OTHER PUBLICATIONS

Written Opinion of the International Searching Authority dated Sep. 2, 2010 in connection with International Patent Application No. PCT/CN2010/073178.

(Continued)

*Primary Examiner* — Mohammad Islam
(74) *Attorney, Agent, or Firm* — Huawei Device Co., Ltd.

(57) ABSTRACT

In the field of communications, a method and a system for video conference control, videoconferencing network equipment, and a videoconferencing site are provided. The method for video conference control includes: assigning a site identifier to a videoconferencing site, and constructing a site list to be delivered to the videoconferencing site; receiving a conference control request sent by the videoconferencing site, the conference control request carrying a site identifier and an operation type of a controlled site; and performing a conference control operation on the controlled site according to the conference control request.

14 Claims, 7 Drawing Sheets

(56) References Cited

OTHER PUBLICATIONS

Translation of Office Action dated Nov. 12, 2010 in connection with Chinese Patent Application No. 200910085742.8.
Translation of Office Action dated Jun. 2, 2011 in connection with Chinese Patent Application No. 200910085742.8.
Translation of Office Action dated Sep. 7, 2011 in connection with Chinese Patent Application No. 200910085742.8.
International Search Report dated Sep. 2, 2010 in connection with International Patent Application No. PCT/CN2010/073178.
Extended European Search Report dated Jun. 22, 2012 in connection with European Patent Application No. 10780060.9,6 pages.

* cited by examiner

METHOD AND SYSTEM FOR VIDEO CONFERENCE CONTROL, VIDEOCONFERENCING NETWORK EQUIPMENT, AND VIDEOCONFERENCING SITE

CROSS-REFERENCE TO RELATED APPLICATIONS

This application is a continuation of International Application No. PCT/CN2010/073178, filed on May 25, 2010, which claims priority to Chinese Patent Application No. 200910085742.8, filed on May 27, 2009, both of which are hereby incorporated by reference in their entireties.

TECHNICAL FIELD

The present invention relates to the field of communications, and in particular, to a method and a system for video conference control, videoconferencing network equipment, and a videoconferencing site.

BACKGROUND

The existing conventional videoconferencing system is a system providing video/audio exchange based on H.323, H.320, and Session Initiation Protocol (SIP) standard protocols, typical use of which lies in adopting one channel video/audio input and one channel video/audio output. With the development of the technology, a telepresence conference system is put forward, which generally implements transmission of multiple video streams by binding multiple videoconferencing terminals. FIG. 1 is a typical schematic structure diagram of a telepresence site in a telepresence conference system in the prior art. As shown in FIG. 1, a camera group includes a camera 101, a camera 102, and a camera 103 from left to right in sequence; generally, each camera is one-to-one corresponding to each terminal, and each terminal is connected to a display at a corresponding user area. For example, the camera 101, a terminal 104, a display 107, and a user area 110 may form a first group of corresponding relationship; the camera 102, a terminal 105, a display 108, and a user area 111 may form a second group of corresponding relationship; and the camera 103, a terminal 106, a display 109, and a user area 112 may form a third group of corresponding relationship. That is, the devices included in each group send and receive corresponding images, encode and decode the corresponding images, and display the corresponding images.

During the implementation of the present invention, the inventor finds that the prior art at least has the following disadvantages. The application that the existing multi-display telepresence conference system implements transmission of multiple video streams by binding multiple videoconferencing terminals is limited to a point-to-point scenario, so the problem of controlling the telepresence conference between multiple points occurs with the popularity of the telepresence conference system between multiple points. The conference control manner of the existing telepresence conference system between multiple points is simple; especially, the telepresence site side of the telepresence conference system can only perform the control over the site thereof, but cannot perform the control over other sites in the telepresence conference system, and users in the site thereof cannot choose to view other sites arbitrarily through the terminal. Besides, for a hybrid system of the conventional videoconferencing system and the telepresence conference system, cross-conference control cannot be implemented between the two conference systems.

SUMMARY

The present invention is directed to a method and a system for video conference control, videoconferencing network equipment, and a videoconferencing site, so as to implement conference control over a telepresence conference system between multiple points and conference control over a hybrid system of the telepresence conference system and the conventional videoconferencing system.

A method for video conference control is provided in an embodiment of the present invention, which includes:

assigning a site identifier to a videoconferencing site, and constructing a site list to be delivered to the videoconferencing site, the videoconferencing site including telepresence sites and/or ordinary videoconference sites;

receiving a conference control request sent by the videoconferencing site, the conference control request carrying a site identifier and an operation type of a controlled site; and performing a conference control operation on the controlled site according to the conference control request, the controlled site including a controlled telepresence site and/or a controlled ordinary videoconference site.

Videoconferencing network equipment is further provided in an embodiment of the present invention, which includes:

a multipoint control unit (MCU), configured to assign a site identifier to a videoconferencing site, construct a site list to be delivered to the videoconferencing site, receive a conference control request sent by the videoconferencing site, and perform a processing operation on a controlled site according to the conference control request, where the videoconferencing site includes telepresence sites and/or ordinary videoconference sites, the controlled site includes a controlled telepresence site and/or a controlled ordinary videoconference site, and the conference control request carries a site identifier and an operation type of the controlled site.

A videoconferencing site is further provided in an embodiment of the present invention, which includes:

a terminal, configured to send a conference control request to an MCU, or execute a conference control operation instruction sent by the MCU, the conference control request carrying a site identifier and an operation type of a controlled site, or carrying a site identifier and an operation type of a controlled site and a display identifier of a telepresence site and/or a designated code-stream identifier of a controlled telepresence site; and a display, configured to display image information of the controlled site.

A system for video conference control is further provided in an embodiment of the present invention, which includes the videoconferencing network equipment and the videoconferencing site described above.

In view of the above technical solutions, according to the method and the system for video conference control, the videoconferencing network equipment, and the videoconferencing site in the embodiments of the present invention, a simplified site identifier may be assigned to a multi-display videoconferencing site, so as to facilitate uniform management of the videoconferencing site; a site participating in a video conference may actively initiate a conference control request, and the videoconferencing network equipment processes the conference control request to implement conference control on a controlled site; and conference control on videoconferencing sites of mixed ordinary videoconference sites and telepresence sites is also implemented.

BRIEF DESCRIPTION OF THE DRAWINGS

The accompanying drawings are included to provide a further understanding of the present invention, and constitute a part of this specification, but are not intended to limit the present invention. In the accompanying drawings.

DETAILED DESCRIPTION

In order to make the objectives, technical solutions, and advantages of the present invention more comprehensible, the present invention is further described in detail below with reference to embodiments and the accompanying drawings. Herein, the exemplary embodiments of the present invention and descriptions thereof are only intended to explain the present invention, instead of limiting the present invention.

Figure 1:
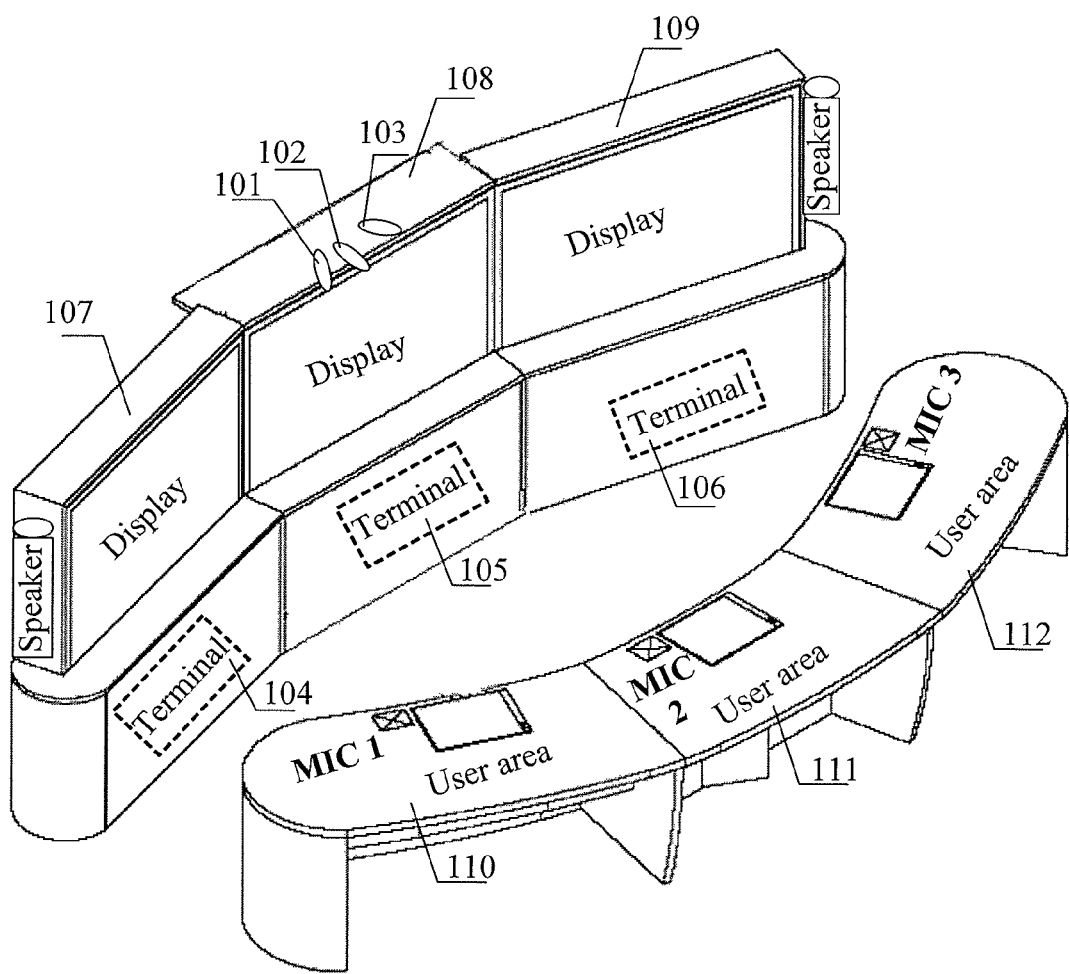
FIG. 1 is a typical schematic structure diagram of a telepresence site in a telepresence conference system in the prior art.
Figure 2:
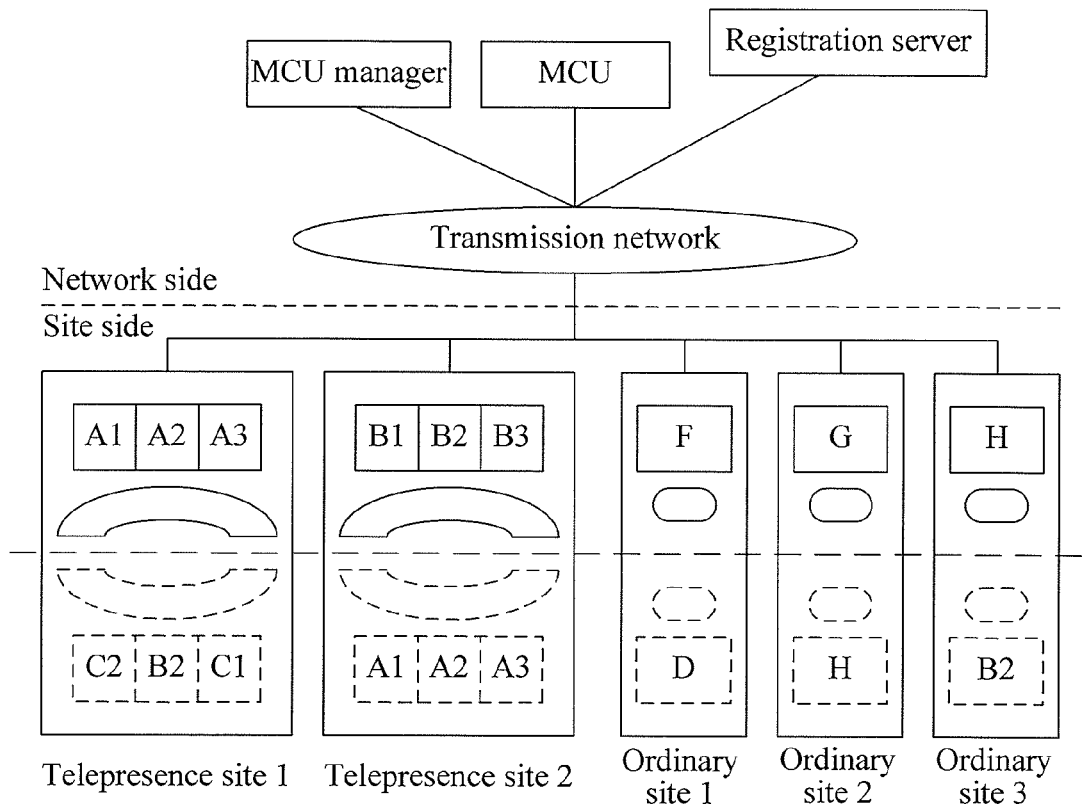
FIG. 2 is a schematic structure diagram of a videoconferencing system according to the present invention.

FIG. 2 is a schematic structure diagram of a videoconferencing system according to the present invention. As shown in FIG. 2, the system includes: an MCU, an MCU manager, a registration server (optional), a transmission network, telepresence conference sites (referred to as telepresence sites for short), and ordinary videoconferencing sites (referred to as ordinary sites for shorts). The major conference control components (not shown in FIG. 2) of the telepresence site include: a camera group, a terminal set corresponding to respective cameras in the camera group, and a display correspondingly connected to the terminal. As a control end, the terminal is configured to construct and send a conference control request; while as a controlled end, the terminal is configured to execute a conference control operation instruction sent from the MCU; and the display is configured to display image information captured by a camera in a remote controlled site. The telepresence site may also include a site-side operating device and a touch control screen connected to the site-side operating device; the telepresence site may also uniformly manage respective terminals through the touch control screen of the site-side operating device, and information such as the conference control request, call, and conference convening may also be constructed on the touch control screen; and the site-side operating device may conduct communication with the terminal through a serial port or over IP. In FIG. 2, the solid line on the site side indicates a site, and the dotted line indicates images of other sites displayed on the display corresponding to the terminal.

For the structure of the videoconferencing system, the conference control functions with respect to the whole site and performed in the telepresence site or the ordinary site mainly include: site list display, site list refresh, site naming, site selection/broadcast, free discussion, site addition, conference ending, chairperson application/release, silence, mute, site calling, and site hangup. These conference control functions may belong to ordinary conference control functions, and the conference control method thereof is specifically described below in the specific embodiments of the present invention. Besides, for the conference control function specific to the telepresence site, such as screen image switch, the conference control method thereof is also described in detail below in the specific embodiments of the present invention.

Figure 3:
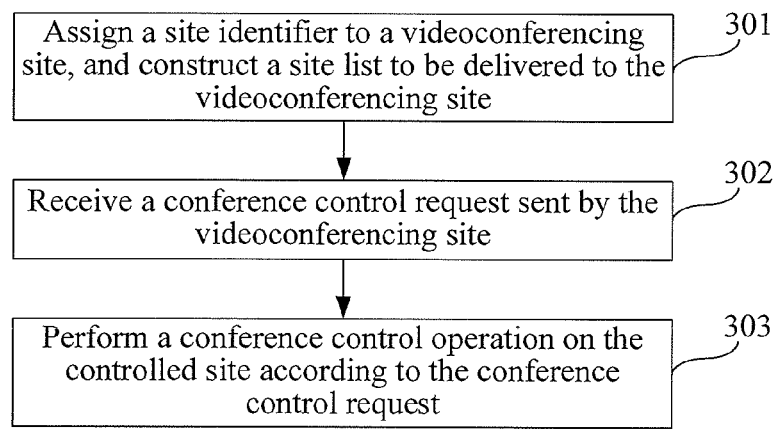
FIG. 3 is a schematic flow chart of a first embodiment of a method for video conference control according to the present invention.

FIG. 3 is a schematic flow chart of a first embodiment of a method for video conference control according to the present invention. As shown in FIG. 3, the following steps are included.

Step 301: Assign a site identifier to a videoconferencing site, and construct a site list to be delivered to the videoconferencing site.

Videoconferencing sites may include more than one telepresence site and/or more than one ordinary site. When the videoconferencing sites only include a plurality of ordinary sites, the existing conference control method may be adopted to control the videoconferencing sites. When the videoconferencing sites only include a plurality of telepresence sites, or include a plurality of telepresence sites and a plurality of ordinary sites, a site identifier assigned by an MCU to a telepresence site is not each terminal identifier of respective terminals included therein, but a collective site identifier. Then, the MCU constructs the site identifiers of all the sites of the video conference convened thereby into a site list, and delivers the site list to respective videoconferencing sites.

Step 302: Receive a conference control request sent by the videoconferencing site, the conference control request carrying a site identifier and an operation type of a controlled site.

In the structure of the videoconferencing system shown in FIG. 2, a hosting videoconferencing site may send a conference control request to the MCU, where the conference control request carries a site identifier of a controlled site to be controlled and a type of a control operation to be performed on the controlled site, including operations of site naming, site selection/broadcast, free discussion, conference ending, silence, mute, site calling, site hangup, and screen image switch.

Step 303: Perform a conference control operation on the controlled site according to the conference control request.

The MCU controls the video/audio and conference state corresponding to the controlled site in the video conference according to information carried in the conference control request. In this embodiment of the present invention, if code streams of respective video sites are all converged on the MCU side, the operation is generally executed by the MCU directly on the corresponding code streams according to the conference control request. The controlled site may include a controlled telepresence site and/or a controlled ordinary site.

The method for video conference control according to this embodiment may simplify the site identifier of the telepresence site, so that uniform management on sites can be implemented in a videoconferencing system structure of mixed telepresence sites and ordinary sites. Further, the conference control function on the controlled telepresence site and/or the controlled ordinary site can be implemented according to the conference control request and the site identifier carried therein.

Figure 4:
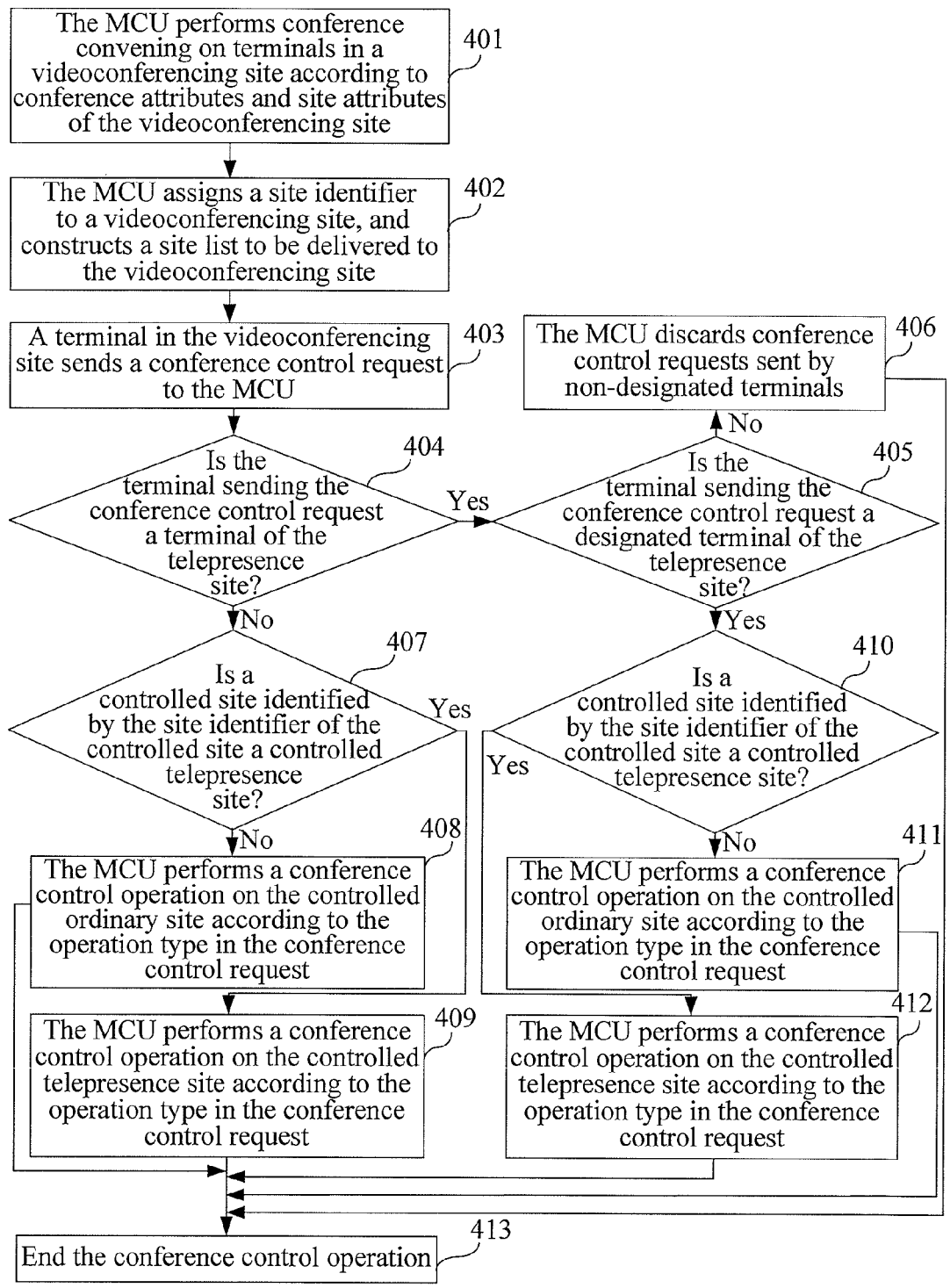
FIG. 4 is a schematic flow chart of a second embodiment of the method for video conference control according to the present invention.

FIG. 4 is a schematic flow chart of a second embodiment of the method for video conference control according to the present invention. As shown in FIG. 4, a videoconferencing system of mixed ordinary sites and telepresence sites is taken as an example to describe implementation of an ordinary conference control function with respect to the whole site, which includes the following operations.

Step 401: An MCU performs conference convening on terminals in a videoconferencing site according to conference attributes and site attributes of the videoconferencing site.

The MCU manager sets the conference attributes and the site attributes of the videoconferencing site, where the site attributes include the number of code streams of the videoconferencing site or the number of bound terminals, terminal numbers, and information of a designated terminal, and the conference attributes include conference bandwidth and encryption information; the conference attributes and the site attributes of the videoconferencing site are sent to the MCU; and the MCU performs conference convening on terminals in the videoconferencing sites according to the conference attributes and the site attributes; or one videoconferencing site sets conference attributes and site attributes of the videoconferencing site and other videoconferencing sites, where the site attributes include the number of code streams of the videoconferencing sites or the number of bound terminals, terminal numbers, and information of the designated terminal, and the conference attributes include conference bandwidth and encryption information; the conference attributes and the site attributes of the videoconferencing sites are sent to the MCU through the MCU manager; and the MCU performs conference convening on terminals in the videoconferencing sites according to the conference attributes and the site attributes; or one videoconferencing site sets conference attributes and site attributes of the videoconferencing site and other videoconferencing sites, where the site attributes include a designated terminal number of the telepresence site or include a designated terminal number of the telepresence site and a terminal number of the ordinary site, and the conference attributes include conference bandwidth and encryption information; the conference attributes and the site attributes of the videoconferencing sites are sent to the MCU manager; the MCU manager judges whether the videoconferencing sites are telepresence sites according to definitions of the site attributes thereon, and if the MCU manager judges that the videoconferencing sites are telepresence sites according to the definitions of the site attributes thereon, adds other terminal numbers in the telepresence sites in the site attributes in the solution that multiple terminals are bound in the telepresence sites, and sends the conference attributes and the supplemented site attributes to the MCU; and the MCU performs conference convening on terminals in the videoconferencing sites according to the conference attributes and the site attributes.

Step 402: The MCU assigns a site identifier to a videoconferencing site, and constructs a site list to be delivered to the videoconferencing site.

The assigning, by the MCU, a site identifier to a videoconferencing site specifically includes: if the videoconferencing site is an ordinary site, assigning a terminal identifier to a terminal in the ordinary site, and taking the terminal identifier as the site identifier; or if the videoconferencing site is a telepresence site, assigning a terminal identifier to a designated terminal or assigning terminal identifiers to respective terminals in the telepresence site, and taking the identifier of the designated terminal as the site identifier, where the designated terminal is a terminal performing conference control interaction with the MCU.

The assigning a terminal identifier to a terminal in the telepresence site may include assigning terminal identifiers to all terminals in the telepresence site, or only assigning a terminal identifier to a designated terminal in the telepresence site but not assigning terminal identifiers to other terminals.

Step 403: A terminal in the videoconferencing site sends a conference control request to the MCU.

The conference control request carries a site identifier and an operation type of a controlled site, and the operation type is an ordinary conference control operation with respect to the whole site, such as the operations of site naming, site selection/broadcast, free discussion, conference ending, silence, mute, site calling, and site hangup.

Step 404: The MCU judges whether the terminal sending the conference control request is a terminal of the telepresence site, and if the MCU judges that the terminal sending the conference control request is a terminal of the telepresence site, step 405 is performed; while if the MCU judges that the terminal sending the conference control request is not a terminal of the telepresence site, step 407 is performed.

Step 405: The MCU judges whether the terminal sending the conference control request is a designated terminal of the telepresence site, and if the MCU judges that the terminal sending the conference control request is not a designated terminal of the telepresence site, step 406 is performed; while if the MCU judges that the terminal sending the conference control request is a designated terminal of the telepresence site, step 410 is performed.

The designated terminal may be a previously set designated terminal or another terminal of the telepresence site.

Step 406: The MCU discards conference control requests sent by non-designated terminals, and step 413 is performed.

Step 407: The conference control request is sent by a terminal in the ordinary site, the MCU judges whether a controlled site identified by the site identifier of the controlled site in the conference control request sent by the terminal in the ordinary site is a controlled telepresence site, and if the MCU judges that the controlled site identified by the site identifier of the controlled site in the conference control request sent by the terminal in the ordinary site is not a controlled telepresence site, step 408 is performed; while if the MCU judges that the controlled site identified by the site identifier of the controlled site in the conference control request sent by the terminal in the ordinary site is a controlled telepresence site, step 409 is performed.

Step 408: The controlled site identified by the site identifier of the controlled site in the conference control request is a controlled ordinary site, and the MCU performs a conference control operation on the controlled ordinary site according to the operation type in the conference control request, and step 413 is performed.

Step 409: The MCU performs a conference control operation on the controlled telepresence site according to the operation type in the conference control request, and step 413 is performed.

Step 410: The MCU judges whether the controlled site identified by the site identifier of the controlled site in the conference control request sent by the telepresence site is a controlled telepresence site, and if the MCU judges that the controlled site identified by the site identifier of the controlled site in the conference control request sent by the telepresence site is not a controlled telepresence site, step 411 is performed; while if the MCU judges that the controlled site identified by the site identifier of the controlled site in the conference control request sent by the telepresence site is a controlled telepresence site, step 412 is performed.

Step 411: The controlled site identified by the site identifier of the controlled site in the conference control request is a controlled ordinary site, the MCU performs a conference control operation on the controlled ordinary site according to the operation type in the conference control request, and step 413 is performed.

In step 411, a designated terminal of the telepresence site sends a conference control request for conference control over the controlled ordinary site. One situation is that, communication signaling between the telepresence site and the MCU is ordinary conference control request signaling, and the conference control request may be made for operations such as naming of the controlled telepresence site, selection/broadcast of the controlled telepresence site, and free discussion. The conference control request mainly includes a site identifier and an operation type of the controlled site. In this case, by taking selection of a controlled ordinary site as an example, the MCU performs a selection operation on the controlled ordinary site according to the conference control request as follows: switching image information of the controlled ordinary site to a display corresponding to a certain terminal on the telepresence site side for display, where the terminal may be the designated terminal sending the conference control request or another terminal. In the case of a broadcast operation, the image information of the controlled ordinary site may be displayed on displays corresponding to designated terminals of a plurality of telepresence sites in the videoconferencing system.

Step 412: The MCU performs a conference control operation on the controlled telepresence site according to the operation type in the conference control request, and step 413 is performed.

In step 412, a designated terminal of the telepresence site sends a conference control request for performing a conference control operation over the controlled telepresence site. One situation is that, communication signaling between the telepresence site and the MCU is ordinary conference control request signaling, and the conference control request may be made for operations such as naming of the controlled telepresence site, selection/broadcast of the controlled telepresence site, and free discussion. The conference control request mainly includes a site identifier and an operation type of the controlled site. In the case, by taking selection of a controlled telepresence site as an example, the MCU performs a corresponding selection operation on the controlled telepresence site according to the conference control request, and the operation conforms to a corresponding relationship between cameras and displays. As shown by the telepresence site 2 in FIG. 2, displays in the local telepresence site display image information corresponding to cameras in the telepresence site 1 in sequence, that is, the A1 image is displayed on a display corresponding to B1, the A2 image is displayed on a display corresponding to B2, and the A3 image is displayed on a display corresponding to B3. In the case of a screen switch operation of the broadcast type, image information corresponding to the controlled telepresence site can be displayed on displays corresponding to a plurality of telepresence sites in the videoconferencing system.

Step 413: End the conference control operation.

The method for video conference control according to this embodiment is based on the conventional video conference function and extends the conference control function performed by the videoconferencing site on other videoconferencing sites; and further, by simplifying the site identifier of the telepresence site, uniform management on various sites can be implemented a videoconferencing system structure of mixed telepresence sites and ordinary sites.

Figure 5:
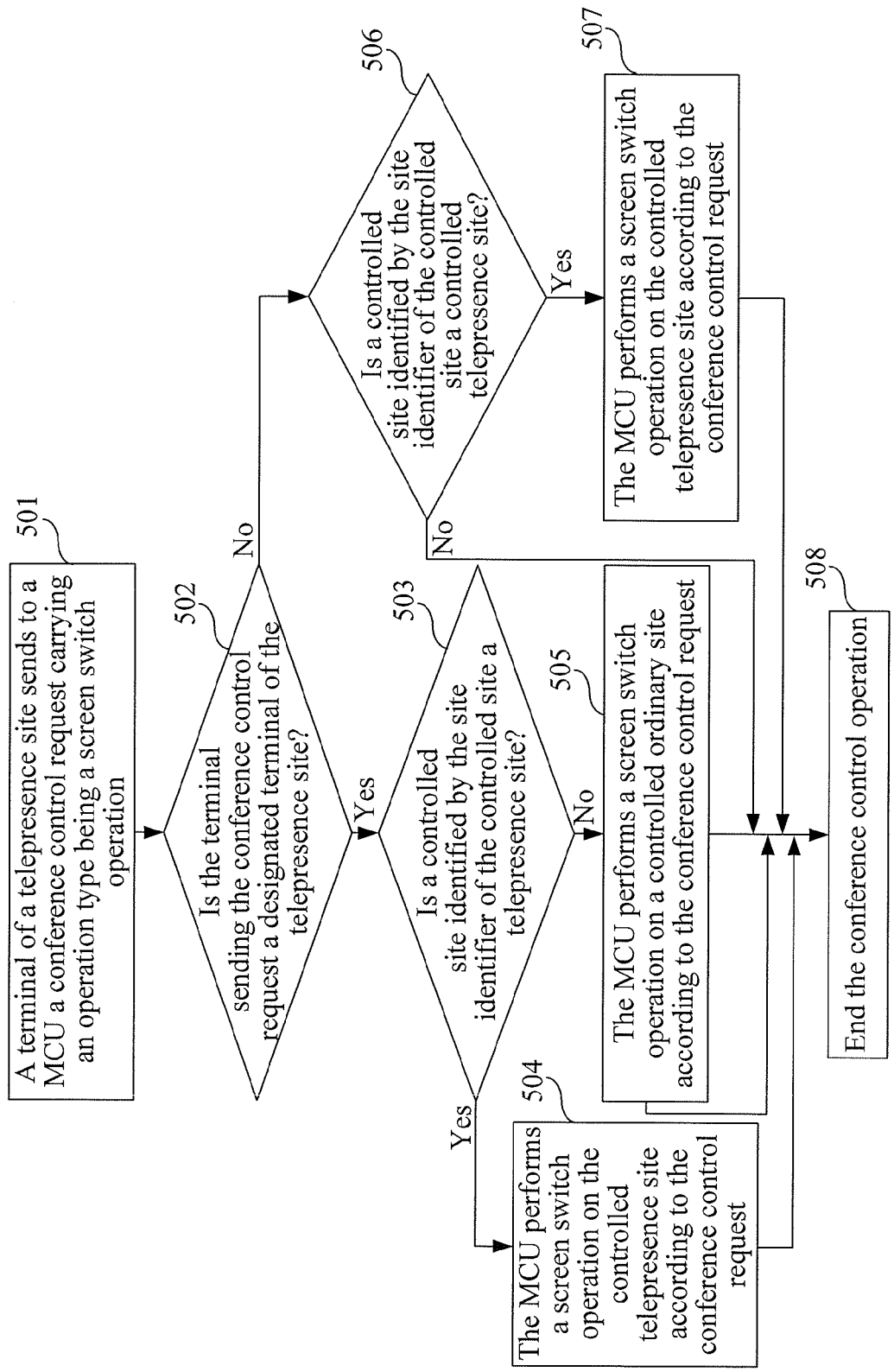
FIG. 5 is a schematic flow chart of a third embodiment of the method for video conference control according to the present invention.

FIG. 5 is a schematic flow chart of a third embodiment of the method for video conference control according to the present invention. A videoconferencing system of mixed ordinary sites and presence sites is taken as an example to describe implementation of a conference control function specific to a telepresence site. The specific conference control function, for example, a screen switch operation, as shown in FIG. 5, includes the following steps.

Step 501: A terminal of a telepresence site sends to an MCU a conference control request carrying an operation type being a screen switch operation.

The conference control request may at least carry a site identifier of a controlled site, and the screen switch operation may be of a selection type or a broadcast type. The screen switch operation of the selection type is that image information of the controlled site is only displayed on a screen at the telepresence site side sending the conference control request; and the screen switch operation of the broadcast type is that the image information of the controlled site is displayed on screens corresponding to a plurality of telepresence sites in the videoconferencing system.

Step 502: The MCU judges whether the terminal sending the conference control request is a designated terminal of the telepresence site, and if the MCU judges that the terminal sending the conference control request is a designated terminal of the telepresence site, step 503 is performed; while if the MCU judges that the terminal sending the conference control request is not a designated terminal of the telepresence site, step 506 is performed.

Step 503: The MCU judges whether a controlled site identified by the site identifier of the controlled site in the conference control request sent by the designated terminal in the telepresence site is a telepresence site, and if the MCU judges that the controlled site identified by the site identifier of the controlled site in the conference control request sent by the designated terminal in the telepresence site is a telepresence site, step 504 is performed; while if the MCU judges that the controlled site identified by the site identifier of the controlled site in the conference control request sent by the designated terminal in the telepresence site is not a telepresence site, step 505 is performed.

Step 504: The MCU performs a screen switch operation on the controlled telepresence site according to the conference control request, and step 508 is performed.

In step 504, the MCU performs a screen switch operation on the controlled telepresence site according to the conference control request, which is specifically divided into the following situations.

Situation 1: The conference control request carrying a site identifier and an operation type of the controlled site is extended to carry a display identifier of a telepresence site. In this case, according to whether it is the screen switch operation of the selection type or the screen switch operation of the broadcast type, the MCU performs a screen switch operation on the controlled telepresence site according to the conference control request as follows: according to a display identifier of a local telepresence site in the conference control request, processing default image information of the controlled telepresence site and then displaying the processed image information on a display in the local telepresence site corresponding to the display identifier or on corresponding displays in a plurality of telepresence sites in the videoconferencing system. The default image information may be image information corresponding to a designated terminal of a default controlled telepresence site, or image information corresponding to another terminal of the default controlled telepresence site, or image information corresponding to one default code stream in multiple code streams in a terminal of a controlled telepresence site. As shown by the telepresence site 1 in FIG. 2, image information corresponding to C2 in the telepresence site is displayed on a display corresponding to A1.

Situation 2: The conference control request carrying a site identifier and an operation type of the controlled site is extended to carry a display identifier of a telepresence site and a designated code-stream identifier of a controlled telepresence site. The designated code-stream identifier may be an identifier of one of multiple code streams included in one terminal of the controlled telepresence site, or an identifier of a code stream corresponding to one of a plurality of terminals in the controlled telepresence site. According to the differences between the code-stream identifiers, Situation 2 may specifically include the following two aspects.

In one aspect, the designated code-stream identifier is an identifier of a code stream corresponding to one of a plurality of terminals in the controlled telepresence site, that is, the controlled telepresence site may include a plurality of terminals, each terminal respectively includes code stream information of images corresponding thereto, and some terminals may include a plurality of pieces of corresponding code stream information. In this case, according to the screen switch operation of the selection type, the MCU performs a screen switch operation on the controlled telepresence site according to the conference control request as follows: according to a display identifier of a telepresence site and a terminal identifier of a controlled telepresence site in the conference control request, processing image information of a designated terminal of the controlled telepresence site corresponding to the terminal identifier and decoding the processed image information at a terminal in the local telepresence site corresponding to the display identifier, and then displaying the image information on a display corresponding to the terminal. In the case of the broadcast type, after image information of the designated terminal of the controlled telepresence site corresponding to the terminal identifier is processed, the image information is decoded in corresponding terminals in a plurality of telepresence sites of the videoconferencing system, and then images are displayed on corresponding displays. As shown by the telepresence site 1 in FIG. 2, image information corresponding to C1 in the telepresence site is displayed on a display corresponding to A3.

In the other aspect, the designated code-stream identifier is an identifier of one of multiple code streams included in one terminal of the controlled telepresence site. That is, the controlled telepresence site only includes one terminal having multiple code streams thereon; or only a designated terminal in the telepresence site has the signaling capability of communicating with the MCU, other terminals are only responsible for video encoding/decoding, and the designated terminal has the capability of encoding/decoding multiple code streams. The conference control request is extended to carry a display identifier of a telepresence site and a designated code-stream identifier of a controlled telepresence site. After receiving a conference control request of a screen switch operation instruction sent by a designated terminal in the telepresence site, the MCU may send code stream information corresponding to the designated code-stream identifier of the controlled telepresence site obtained by the designated terminal of the controlled telepresence site to a terminal corresponding to the display identifier of the telepresence site sending the conference control request for decoding, and then display the code stream information on a corresponding display.

Step 505: The MCU performs a screen switch operation on a controlled ordinary site according to the conference control request, and step 508 is performed.

In step 505, the MCU performs a screen switch operation on the controlled ordinary site according to the conference control request specifically as follows.

The conference control request carrying a site identifier and an operation type of the controlled site is extended to carry the display identifier of the telepresence site. In this case, if it is the screen switch operation of the selection type, the MCU performs a screen switch operation on the controlled ordinary site according to the conference control request as follows: according to the display identifier of the telepresence site in the conference control request, processing image information of the controlled ordinary site and then displaying the processed image information on a display in the telepresence site initiating the conference control request corresponding to the display identifier. If it is the screen switch operation of the broadcast type, the image information of the controlled ordinary site is displayed on displays corresponding to the display identifier in a plurality of telepresence sites of the videoconferencing system.

Step 506: The MCU judges whether a controlled site identified by the site identifier of the controlled site in the conference control request sent by another terminal in the telepresence site is a telepresence site, and if the MCU judges that the controlled site identified by the site identifier of the controlled site in the conference control request sent by another terminal in the telepresence site is a telepresence site, step 507 is performed; while if the MCU judges that the controlled site identified by the site identifier of the controlled site in the conference control request sent by another terminal in the telepresence site is not a telepresence site, step 508 is performed.

Step 507: The MCU performs a screen switch operation on the controlled telepresence site according to the conference control request.

In step 507, similar to Situation 2 in step 504, except that in this case the conference control request is extended to carry only the designated code-stream identifier of the controlled telepresence site but not the display identifier. The terminal corresponding to a display for displaying or other terminal directly sends a conference control request, and then according to a designated code-stream identifier of the controlled telepresence site in the conference control request, image information of the controlled telepresence site corresponding to the designated code-stream identifier is processed and then displayed on a display corresponding to the terminal of the telepresence site sending the conference control request. As shown by the telepresence site 1 in FIG. 2, image information corresponding to C2 in the telepresence site is displayed on a display corresponding to A1.

Step 508: End the conference control operation.

Figure 6:
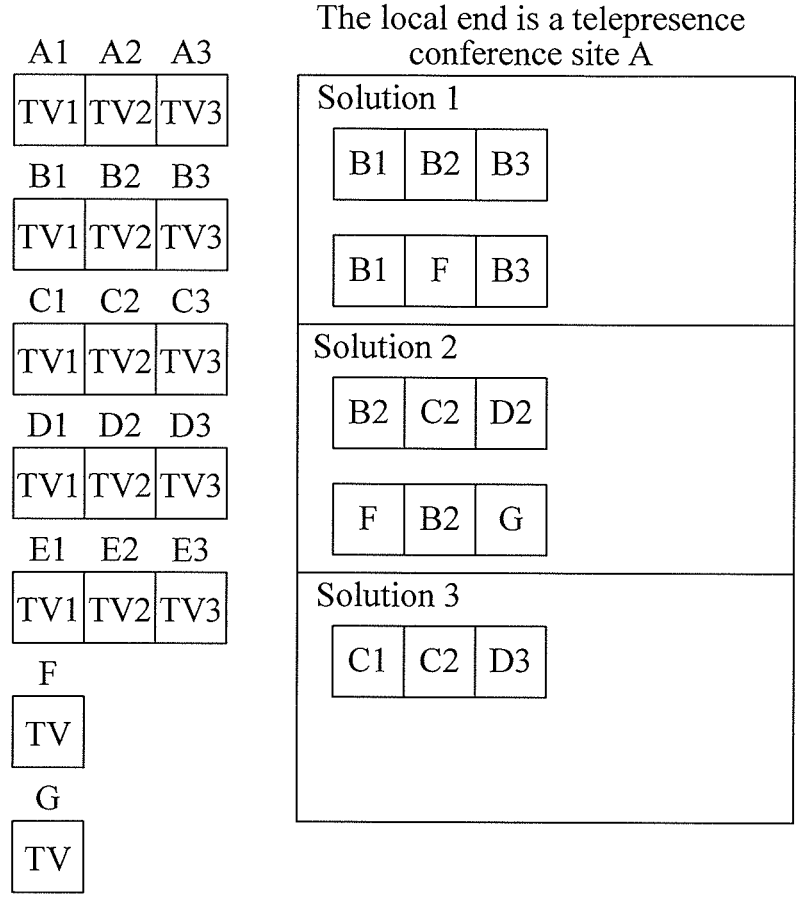
FIG. 6 is a schematic diagram of different solutions that a telepresence site displays different site images according to an embodiment of the present invention.

The specific operation of displaying image information of the controlled ordinary site or the controlled telepresence site in the telepresence site is summarized as follows. FIG. 6 is a schematic diagram of different solutions that a telepresence site displays different site images according to an embodiment of the present invention. As shown in FIG. 6, five telepresence sites A, B, C, D, and E are included, where each telepresence site includes three terminals, and two ordinary sites F and G are included, and each ordinary site only includes one terminal. In the following description about the solutions, it is assumed that the local end is the telepresence site A.

Solution 1

When the telepresence site A sending the conference control request selects or broadcasts image information of the ordinary site F, if the conference control request sent by the telepresence site A does not carry the display identifier of the telepresence site A, the MCU takes by default that the display identifier of the telepresence site A carried in the conference control request is the display identifier corresponding to the designated terminal, or the MCU manager configures a display identifier taken by the MCU by default; an intermediate terminal in the telepresence site including three terminals is generally taken as the designated terminal by default, and for the telepresence site A, the designated terminal is A2. Therefore, if it is the operation of selecting image information of the ordinary site F, the MCU sends the image information of the ordinary site F to the designated terminal A2 of the telepresence site A, which decodes the image information and displays the image information on a display corresponding to the designated terminal A2; while if it is the operation of broadcasting image information of the ordinary site F, the MCU sends the image information of the ordinary site F to, for example, respective designated terminals of a plurality of telepresence sites A-E, which decode the image information and display the image information on displays corresponding thereto.

When the telepresence site A sending the conference control request selects or broadcasts image information of the telepresence site B, if the conference control request sent by the telepresence site A does not carry the display identifier of the telepresence site A or the designated code-stream identifier of the controlled telepresence site B for display, the MCU takes by default that the conference control request requests images of three terminals of the controlled telepresence site B to be displayed correspondingly in three terminals of the telepresence site A in sequence. Therefore, if it is the operation of selecting image information of the telepresence site B, the MCU sends the image information corresponding to the three terminals of the controlled telepresence site B to corresponding terminals of the telepresence site A in sequence, the corresponding terminals of the telepresence site A decode the image information, and then the image of B1 is displayed on a display corresponding to A1, the image of B2 is displayed on a display corresponding to A2, and the image of B3 is displayed on a display corresponding to A3; while if it is the operation of broadcasting image information of the telepresence site B, the MCU sends the image information of all the terminals of the telepresence site B to, for example, respective corresponding terminals of a plurality of telepresence sites A, D, and E, which decode the image information and display the image information on displays corresponding thereto.

Solution 2

When the telepresence site A sending the conference control request selects or broadcasts image information of the ordinary site F, the conference control request sent by the telepresence site A carries the display identifier of the telepresence site A, for example, carries a display identifier corresponding to A3. Therefore, if it is the screen switch operation of the selection type, the MCU sends the image information of the ordinary site F to the terminal A3 of the telepresence site A, which decodes the image information and displays the image information on a display of the terminal A3; while if it is the screen switch operation of the broadcast type, the MCU sends the image information of the ordinary site F to, for example, respective terminals A3 and B3 of a plurality of telepresence sites A and B, which decode the image information and display the image information on displays corresponding thereto. Images of B1 and B2 can be continuously displayed on displays corresponding to terminals A1 and A2 of the telepresence site A.

When the telepresence site A sending the conference control request selects image information of designated terminals of telepresence sites B, C, and D, the conference control request sent by the telepresence site A carries the display identifiers of the telepresence site A, and may optionally carry image identifiers corresponding to the designated terminals of the controlled telepresence sites. In this embodiment, when the telepresence site A sending the conference control request performs an operation, it can be determined that the display identifier of A1 corresponds to the site identifier of the telepresence site B, the display identifier of A2 corresponds to the site identifier of the telepresence site C, the display identifier of A3 corresponds to the site identifier of the telepresence site D, and then the conference control request carrying the above information is sent. Therefore, finally, image information of B2 is displayed on a display corresponding to A1 of the telepresence site A, image information of C2 is displayed on a display corresponding to A2, and image information of D2 is displayed on a display corresponding to A3.

In this solution, communication signaling between terminals of the telepresence site A and the MCU may also be ordinary conference control signaling, that is, the display identifier of the telepresence site A is not carried. However, at this time, a terminal corresponding to a designated display must initiate a request to the MCU, instead of making a designated terminal initiate a conference control request to the MCU uniformly. After receiving the conference control request, the MCU judges whether the request is initiated by the telepresence site A or another bound terminal. If the selection type is determined, image information of a designated terminal of a controlled telepresence site to be viewed is sent to a corresponding requesting terminal; while if the broadcast type is determined, the image information of the designated terminal of the controlled telepresence site to be viewed is sent to terminals corresponding to designated displays of respective telepresence sites.

Solution 3

When a designated terminal of the telepresence site A sending the conference control request selects image information of one or more telepresence sites, the conference control request sent by the designated terminal (for example, A2) of the telepresence site A carries the display identifiers of the telepresence site A and designated code-stream identifiers of controlled telepresence sites to be displayed on the displays correspondingly. For example, the image of the terminal C1 is displayed on a display corresponding to A1, the image of the terminal C2 is displayed on a display corresponding to A2, and the image of the terminal D3 is displayed on a display corresponding to A3.

To enable an accurate operation, when Solution 3 is adopted, the telepresence site A sending the conference control request also needs to know attributes of other videoconferencing sites, that is, whether the other videoconferencing sites are ordinary sites or telepresence sites. The reason is that, images corresponding to terminals to be viewed may be selected only with respect to the telepresence site; and the corresponding ordinary site only has one terminal, in which case a designated image identifier does not need to be selected.

The conference control function may also be implemented on the MCU manager, the MCU manager initiates a conference control request, and no terminal of the videoconferencing site needs to send a conference control request.

To facilitate management, it is feasible that only one designated terminal of the telepresence site has the signaling communication capability, and other terminals are only responsible for video encoding/decoding, which are subordinate to the designated terminal. The designated terminal and the MCU conduct communication involving call and control, and even sending and receiving of all media streams of the site. The telepresence site viewed on the MCU side only has one terminal, and the terminal has the capability of encoding/decoding multiple code streams. The operation with respect to the telepresence site on the MCU side is only performed with respect to the designated terminal. The conference control request of Solution 1 can be adopted to process the conference control operation, but the difference only lies in that a conference control request sent by the designated terminal of the telepresence site sending the conference control request carries a code stream number corresponding to a terminal corresponding to a display of the telepresence site sending the conference control request and a code stream number of a controlled telepresence site to be obtained. After obtaining a code stream corresponding to the code stream number from a designated terminal in the controlled telepresence site, the MCU sends the code stream to the designated terminal of the telepresence site sending the conference control request, the designated terminal forwards the code stream to a subordinate terminal corresponding to a display corresponding to the conference control request, and the subordinate terminal decodes the code stream and displays the code stream on the corresponding display, or the MCU directly sends respective corresponding code streams to a media stream receiving address (which is represented as one of a plurality of media stream addresses of the designated terminal on the MCU side) corresponding to the subordinate terminal corresponding to the display corresponding to the conference control request, and the subordinate terminal directly decodes the code stream and then outputs the code stream to the corresponding display for display.

The method for video conference control according to this embodiment is based on the conventional video conference function and extends the conference control function performed by the videoconferencing site on a video conference, and images of different videoconferencing sites can be viewed on different displays of the videoconferencing site, so that a plurality of videoconferencing sites in different positions can be simultaneously displayed in one round-table conference.

Figure 7:
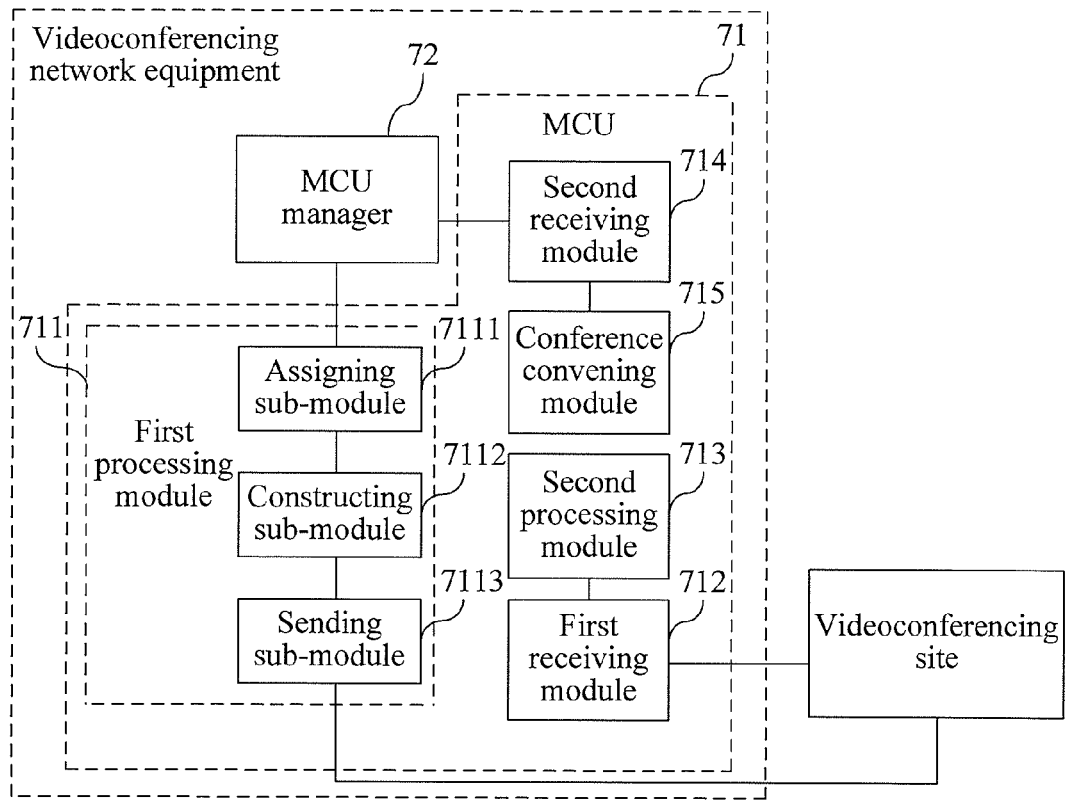
FIG. 7 is a schematic structure diagram of an embodiment of videoconferencing network equipment according to the present invention.

FIG. 7 is a schematic structure diagram of an embodiment of videoconferencing network equipment according to the present invention. As shown in FIG. 7, the videoconferencing network equipment includes: an MCU 71 and an MCU manager 72. The MCU 71 is configured to assign a site identifier to a videoconferencing site and construct a site list to be delivered to the videoconferencing site, receive a conference control request sent by the videoconferencing site, and perform a processing operation on a controlled site according to the conference control request. The MCU manager 72 is configured to set conference attributes and site attributes of the videoconferencing site or receive conference attributes and site attributes of the videoconferencing site and other videoconferencing sites set by the videoconferencing site, and send the attributes to the MCU 71, where the conference attributes and the site attributes of the videoconferencing site and other videoconferencing sites set by the videoconferencing site received by the MCU manager 72 may be directly received or indirectly received through other devices. The videoconferencing sites may include telepresence sites and/or ordinary sites, the controlled sites may include controlled telepresence sites and/or controlled ordinary sites, and the conference control request at least carries a site identifier and an operation type of the controlled site.

The MCU 71 may include: a first processing module 711, a first receiving module 712, and a second processing module 713. The first processing module 711 is configured to assign the site identifier to the videoconferencing site, and construct the site list to be delivered to the videoconferencing site. The first receiving module 712 is configured to receive the conference control request sent by the videoconferencing site. The second processing module 713 is configured to perform a processing operation on the controlled site according to the conference control request received by the first receiving module 712.

Further, the first processing module 711 in the MCU 71 may include: an assigning sub-module 7111, a constructing sub-module 7112, and a sending sub-module 7113. The assigning sub-module 7111 is configured to assign a terminal identifier to a terminal in the videoconferencing site, where if the videoconferencing site is an ordinary site, the terminal identifier serves as the site identifier; and if the videoconferencing site is a telepresence site, an identifier of a designated terminal is the site identifier, the designated terminal being a terminal performing conference control interaction with the MCU. The constructing sub-module 7112 is configured to construct a site list according to the site identifier assigned by the assigning sub-module 7111 to each videoconferencing site. The sending sub-module 7113 is configured to deliver the site list constructed by the constructing sub-module 7112 to each videoconferencing site.

The MCU 71 may further include: a second receiving module 714 and a conference convening module 715. The second receiving module 714 is configured to receive the conference attributes and the site attributes of the videoconferencing site sent by the MCU manager 72. The conference convening module 715 is configured to perform conference convening on terminals in the videoconferencing sites according to the conference attributes and the site attributes of the videoconferencing sites received by the second receiving module 714.

A method for controlling a video conference by the videoconferencing network equipment according to this embodiment may be referred to the description in the embodiments of the method for video conference control, which is not repeated herein.

The videoconferencing network equipment according to this embodiment may assign a simplified site identifier to a multi-display videoconferencing site, so as to facilitate uniform management of the videoconferencing site; a site participating in a video conference may actively initiate a conference control request, and the videoconferencing network equipment processes the conference control request to implement conference control on a controlled site; and conference control on videoconferencing sites of mixed ordinary sites and telepresence sites is also implemented.

Figure 8:
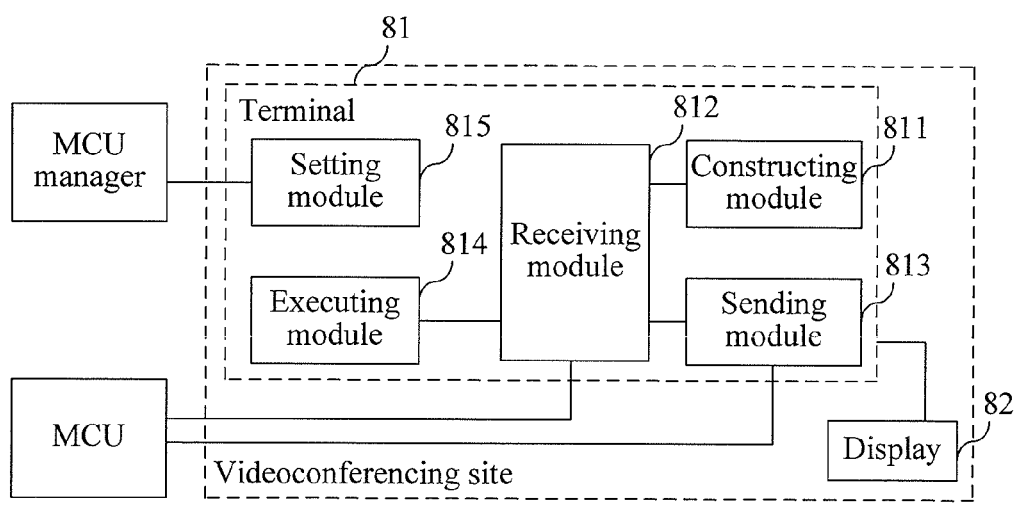
FIG. 8 is a schematic structure diagram of a first embodiment of a videoconferencing site according to the present invention.

FIG. 8 is a schematic structure diagram of a first embodiment of a videoconferencing site according to the present invention. By taking a telepresence site as an example, the videoconferencing site may include three sets of devices, and each set of devices includes a camera, a terminal, a display, and a user area set correspondingly. As shown in FIG. 8, a terminal 81 of the videoconferencing site in this embodiment of the present invention may be configured to send a conference control request to an MCU, or execute a conference control operation instruction sent by the MCU; and a display 82 may be configured to display image information of a controlled site.

The terminal 81 may specifically include: a constructing module 811, a receiving module 812, a sending module 813, and an executing module 814. The constructing module 811 is configured to construct a conference control request, the conference control request carrying a site identifier and an operation type of a controlled site, or carrying a site identifier and an operation type of a controlled site and a display identifier of a local telepresence site and/or a designated code-stream identifier of a controlled telepresence site. The receiving module 812 is configured to receive the conference control request constructed by the constructing module 811, and receive a conference control operation instruction sent by an MCU. The sending module 813 is configured to send the conference control request received by the receiving module 812 to the MCU. The executing module 814 is configured to execute the conference control operation instruction received by the receiving module 812.

The terminal 81 may further include: a setting module 815, configured to set conference attributes and site attributes of the videoconferencing site and other videoconferencing sites, which include the number of code streams of the videoconferencing site or the number of bound terminals and terminal number information, the videoconferencing site being an ordinary site or a telepresence site. The attribute information can be sent to an MCU manager for management.

A method for controlling a video conference by the videoconferencing site according to this embodiment may be referred to the description in the embodiments of the method for video conference control, which is not repeated herein.

According to the videoconferencing site in this embodiment, a site participating in a video conference may actively initiate a conference control request, and the videoconferencing network equipment processes the conference control request to implement conference control on a controlled site; and conference control on videoconferencing sites of mixed ordinary sites and telepresence sites is also implemented.

Figure 9:
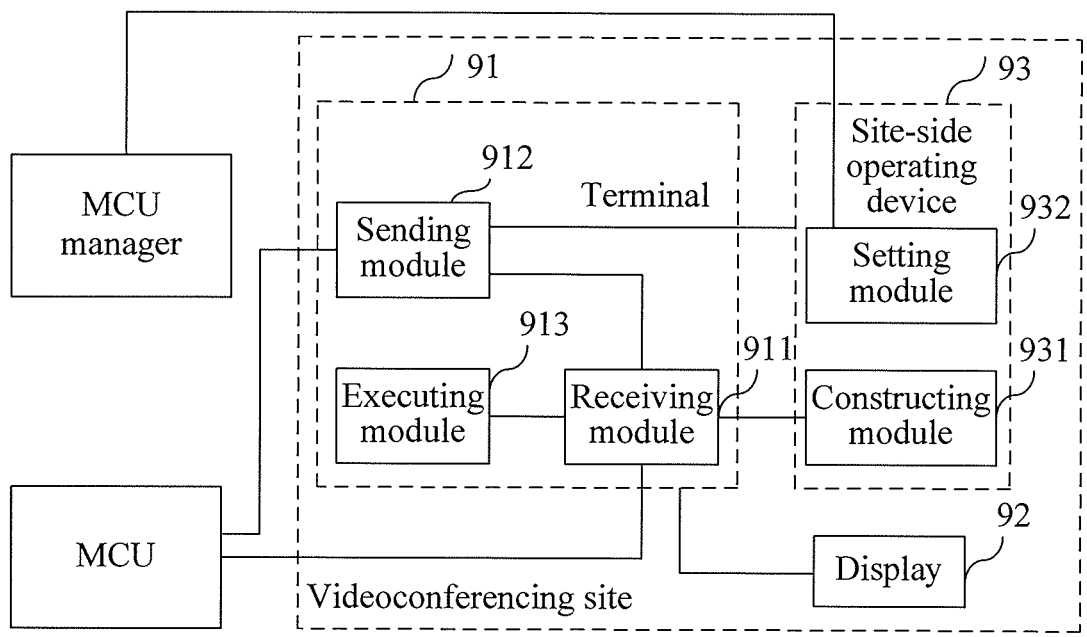
FIG. 9 is a schematic structure diagram of a second embodiment of the videoconferencing site according to the present invention.

FIG. 9 is a schematic structure diagram of a second embodiment of the videoconferencing site according to the present invention. By taking a telepresence site as an example, the videoconferencing site may include three sets of devices, and each set of devices includes a camera, a terminal, a display, and a user area set correspondingly. As shown in FIG. 9, a terminal 91 of the videoconferencing site in this embodiment of the present invention may be configured to send a conference control request to an MCU, or execute a conference control operation instruction sent by the MCU; and a display 92 may be configured to display image information of a controlled site.

The videoconferencing site may further include a site-side operating device 93, where the site-side operating device 93 may include: a constructing module 931 and a setting module 932. The constructing module 931 is configured to construct a conference control request, the conference control request carrying a site identifier and an operation type of a controlled site, or carrying a site identifier and an operation type of a controlled site and a display identifier of a telepresence site and/or a designated code-stream identifier of the controlled telepresence site. The setting module 932 is configured to set conference attributes and site attributes of the videoconferencing site and other videoconferencing sites, which include the number of code streams of the videoconferencing site or the number of bound terminals and terminal number information, the videoconferencing site being an ordinary site or a telepresence site. The attribute information may be sent to an MCU manager for management.

In this case, the terminal 91 may include: a receiving module 911, a sending module 912, and an executing module 913. The receiving module 911 is configured to receive the conference control request constructed by the constructing module 931 in the site-side operating device 93, and receive a conference control operation instruction sent by the MCU. The sending module 912 is configured to send the conference control request received by the receiving module 911 to the MCU, and forward a conference control response message sent by the MCU to the site-side operating device 93. The executing module 913 is configured to execute the conference control operation instruction received by the receiving module 911.

A method for controlling a video conference by the videoconferencing site according to this embodiment may be referred to the description in the embodiments of the method for video conference control, which is not repeated herein.

According to the videoconferencing site in this embodiment, a site participating in a video conference may actively initiate a conference control request, and the videoconferencing network equipment processes the conference control request to implement conference control on a controlled site; and conference control on videoconferencing sites of mixed ordinary sites and telepresence sites is also implemented.

Figure 10:
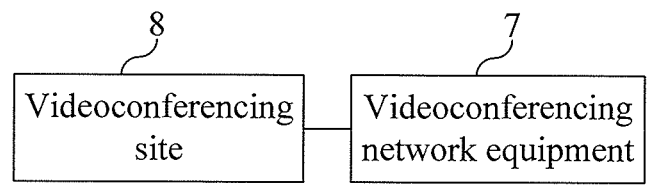
FIG. 10 is a schematic structure diagram of an embodiment of a system for video conference control according to the present invention.

FIG. 10 is a schematic structure diagram of an embodiment of a system for video conference control according to the present invention. As shown in FIG. 10, the system for video conference control includes the videoconferencing network equipment 7 in the above embodiment and the videoconferencing site 8 in the above embodiment.

The system for video conference control according to this embodiment may assign a simplified site identifier to a multi-display videoconferencing site, so as to facilitate uniform management of the videoconferencing site; a site participating in a video conference may actively initiate a conference control request, and the videoconferencing network equipment processes the conference control request to implement conference control on a controlled site; and conference control on videoconferencing sites of mixed ordinary sites and telepresence sites is also implemented.

Persons of ordinary skill in the art should understand that all or a part of the steps in the methods of the embodiments may be accomplished through a program instructing related hardware. The program may be stored in a computer readable storage medium including a Read-Only Memory (ROM), a Random Access Memory (RAM), a magnetic disk, an optical disk, or the like.

The objectives, technical solutions, and beneficial effects of the present invention have been described in further detail through the above specific embodiments. It should be understood that the above descriptions are merely exemplary embodiments of the present invention, but not intended to limit the protection scope of the present invention. Any modification, equivalent replacement, or improvement made without departing from the spirit and principle of the present invention shall fall within the protection scope of the present invention.

What is claimed is:

1. A method for video conference control, the method comprising:

assigning, by a multipoint control unit (MCU), a site identifier to each of a plurality of videoconferencing sites, and constructing a site list to be delivered to each videoconferencing site, wherein a site identifier assigned to a telepresence site of the video conferencing sites is a collective site identifier, the videoconferencing sites including one or more telepresence sites or including one or more telepresence sites and one or more ordinary videoconference sites;

receiving, by the MCU, a conference control request sent by one of the videoconferencing sites serving as a hosting videoconferencing site, the conference control request carrying a site identifier and an operation type of a site controlled by the hosting videoconferencing site;

performing, by the MCU, a conference control operation corresponding to the operation type on the controlled site corresponding to the site identifier of the controlled site according to the conference control request, the controlled site comprising at least one of a controlled telepresence site and a controlled ordinary videoconference site;

wherein the assigning, by the MCU, the site identifier to each of a plurality of video conferencing sites comprises:

when the videoconferencing site is an ordinary videoconference site, assigning a terminal identifier to a terminal in the ordinary videoconference site, and applying the terminal identifier as the site identifier; and when the videoconferencing site is a telepresence site, assigning a terminal identifier to a designated terminal in the telepresence site, or assigning terminal identifiers to respective terminals in the telepresence site and taking one of the terminals as a designated terminal; and applying the identifier of the designated terminal as the site identifier, the designated terminal being a terminal performing conference control interaction with the MCU.

2. The method for video conference control according to claim 1, wherein if the operation type is a screen switch operation, the conference control request further carries a display identifier of the hosting telepresence site sending the conference control request.

3. The method for video conference control according to claim 2, wherein the performing, by the MCU, the conference control operation on the controlled site according to the conference control request comprises:

processing default image information of the controlled telepresence site and displaying the processed default image information on a display in the telepresence site and corresponding to the display identifier according to the display identifier of the telepresence site in the conference control request.

4. The method for video conference control according to claim 2, wherein if the conference control request further carries a designated code-stream identifier of the controlled telepresence site, the performing, by the MCU, the conference control operation on the controlled site according to the conference control request comprises:

processing image information of the controlled telepresence site and corresponding to the designated code-stream identifier and displaying the processed image information on a display in the telepresence site and corresponding to the display identifier according to the display identifier of the telepresence site and the designated code-stream identifier of the controlled telepresence site in the conference control request.

5. The method for video conference control according to claim 3, wherein if the screen switch operation is a broadcast operation, the processed image information is further displayed on displays corresponding to the display identifier in other telepresence sites.

6. The method for video conference control according to claim 4, wherein if the screen switch operation is a broadcast operation, the processed image information is further displayed on displays corresponding to the display identifier in other telepresence sites.

7. The method for video conference control according to claim 1, wherein if the operation type is a screen switch operation and the conference control request further carries a designated code-stream identifier of the controlled telepresence site, the performing, by the MCU, the conference control operation on the controlled site according to the conference control request comprises:

processing image information of the controlled telepresence site corresponding to the designated code-stream identifier and displaying the processed image information on a display corresponding to a terminal of the telepresence site sending the conference control request according to the designated code-stream identifier of the controlled telepresence site in the conference control request.

8. The method for video conference control according to claim 1, wherein before the assigning, by the MCU, a site identifier to each of a plurality of video conferencing sites and constructing a site list to be delivered to each videoconferencing site, the method further comprises:

receiving, by the MCU, conference attributes and site attributes of the videoconferencing site sent by an MCU manager, the site attributes comprising the number of code streams of the videoconferencing site or the number of bound terminals, terminal numbers, and information of the designated terminal; and performing, by the MCU, conference convening on terminals in the videoconferencing sites according to the conference attributes and the site attributes.

9. The method for video conference control according to claim 1, wherein before the assigning, by the MCU, the site identifier to each of a plurality of video conferencing sites and constructing the site list to be delivered to each videoconferencing site, the method further comprises:

receiving, by the MCU, conference attributes and site attributes of a videoconferencing site and other videoconferencing sites set by the videoconferencing site and sent by the videoconferencing site through an MCU manager, the site attributes comprising the number of code streams of the videoconferencing site or the number of bound terminals, terminal numbers, and information of the designated terminal; and performing, by the MCU, conference convening on terminals in the videoconferencing sites according to the conference attributes and the site attributes; or setting, by one videoconferencing site, conference attributes and site attributes of the videoconferencing site and other videoconferencing sites, which comprise a designated terminal number of the telepresence site or a designated terminal number of the telepresence site and a terminal number of the ordinary videoconference site; sending the attributes of the videoconferencing site to the MCU manager; judging, by the MCU manager, whether the videoconferencing site is a telepresence site according to definitions of the site attributes thereon, and if the MCU manager judges that the videoconferencing site is a telepresence site according to definitions of the site attributes thereon, adding other terminal numbers in the telepresence site into the site attributes, and sending modified conference attributes and the supplemented site attributes to the MCU; and performing, by the MCU, conference convening on terminals in the videoconferencing sites according to the conference attributes and the site attributes.

10. Videoconferencing network equipment, comprising:
a multipoint control unit (MCU), configured to assign a site identifier to each of a plurality of video conferencing sites, construct a site list to be delivered to each videoconferencing site, receive a conference control request sent by one of the videoconferencing sites serving as a hosting videoconferencing site, and perform a processing operation on a site controlled by the hosting videoconferencing site corresponding to the operation type on the controlled site corresponding to the site identifier of the controlled site according to the conference control request,
wherein a site identifier assigned to a telepresence site of video conferencing sites is a collective site identifier, the videoconferencing sites includes one or more telepresence sites or includes one or more telepresence sites and one or more ordinary videoconference sites, the controlled site comprising at least one of a controlled telepresence site and a controlled ordinary videoconference site, and the conference control request carries a site identifier and an operation type of the controlled site;
wherein the MCU comprises:
a first processing module, configured to assign the site identifier to each of a plurality of video conferencing sites, and construct the site list to be delivered to each videoconferencing site;
a first receiving module, configured to receive the conference control request sent by the hosting videoconferencing site;
a second processing module, configured to perform the processing operation on the controlled site according to the conference control request received by the first receiving module;
wherein the first processing module comprises: an assigning sub-module, a constructing sub-module and a sending sub-module,
when the videoconferencing site is an ordinary videoconference site, the assigning sub-module, configured to assign a terminal identifier to a terminal in the ordinary videoconference site, and apply the terminal identifier as the site identifier;
when the videoconferencing site is a telepresence site, the assigning sub-module, configured to assign a terminal identifier to a designated terminal in the telepresence site, or assign terminal identifiers to respective terminals in the telepresence site and apply one of the terminals as a designated terminal; and the assigning sub-module, further configured to take the identifier of the designated terminal as the site identifier, wherein the designated terminal being a terminal performing conference control interaction with the MCU;
the constructing sub-module, configured to construct the site list according to the site identifier assigned by the assigning sub-module to each videoconferencing site; and
the sending sub-module, configured to deliver the site list constructed by the constructing sub-module to each videoconferencing site.

11. The videoconferencing network equipment according to claim 10, further comprising:
an MCU manager, configured to set conference attributes and site attributes of the videoconferencing site or receive conference attributes and site attributes of the videoconferencing site and other videoconferencing sites set by the videoconferencing site, and send the attributes to the MCU.

12. The videoconferencing network equipment according to claim 11, wherein the MCU comprises:
a second receiving module, configured to receive the conference attributes and the site attributes of the videoconferencing site sent by the MCU manager; and
a conference convening module, configured to perform conference convening on terminals in the videoconferencing sites according to the conference attributes and the site attributes of the videoconferencing site received by the second receiving module.

13. A system for video conference control, the system comprising a multipoint control unit (MCU) and at least two videoconferencing sites, wherein:
the MCU is configured to assign a site identifier to each of a plurality of video conferencing sites, construct a site list to be delivered to each videoconferencing site, receive a conference control request sent by a hosting videoconferencing site, and perform a processing operation on a site controlled by the hosting videoconferencing site corresponding to the operation type on the controlled site corresponding to the site identifier of the controlled site according to the conference control request; and
a site identifier assigned to a telepresence site of video conferencing sites is a collective site identifier, the videoconferencing site includes one or more telepresence sites or includes one or more telepresence sites and one or more ordinary videoconference sites, the controlled site comprising at least one of a controlled telepresence site and a controlled ordinary videoconference site, and the conference control request carries a site identifier and an operation type of the controlled site;
wherein the MCU comprises:
a first processing module, configured to assign the site identifier to each of a plurality of video conferencing sites, and construct the site list to be delivered to each videoconferencing site;
a first receiving module, configured to receive the conference control request sent by the hosting videoconferencing site;
a second processing module, configured to perform the processing operation on the controlled site according to the conference control request received by the first receiving module;
wherein the first processing module comprises: an assigning sub-module, a constructing sub-module and a sending sub-module,
when the videoconferencing site is an ordinary videoconference site, the assigning sub-module, configured to assign a terminal identifier to a terminal in the ordinary videoconference site, and take the terminal identifier as the site identifier;
when the videoconferencing site is a telepresence site, the assigning sub-module, configured to assign a terminal identifier to a designated terminal in the telepresence site, or assign terminal identifiers to respective terminals in the telepresence site and apply one of the terminals as a designated terminal; and the assigning sub-module, further configured to apply the identifier of the designated terminal as the site identifier, wherein the designated terminal being a terminal performing conference control interaction with the MCU;

the constructing sub-module, configured to construct the site list according to the site identifier assigned by the assigning sub-module to each videoconferencing site; and the sending sub-module, configured to deliver the site list constructed by the constructing sub-module to each videoconferencing site.

14. The method for video conference control according to claim 2, wherein the performing, by the MCU, the conference control operation on the controlled site according to the conference control request comprises:

processing image information of the controlled ordinary videoconference site and displaying the processed image information on a display in the telepresence site and corresponding to the display identifier according to the display identifier of the telepresence site in the conference control request.

* * * * *